United States Patent [19]

Sutch

[11] 3,931,385
[45] Jan. 6, 1976

[54] METHOD FOR THE PRODUCTION OF COMPOSITE CONTAINERS

[75] Inventor: Brian Leo Chudleigh Sutch, Thames Ditton, England

[73] Assignee: Airfix Industries Limited, London, England

[22] Filed: Feb. 12, 1974

[21] Appl. No.: 441,892

[30] Foreign Application Priority Data
Feb. 12, 1973 United Kingdom............. 6722/73
Mar. 22, 1973 United Kingdom............. 14016/73

[52] U.S. Cl................ 264/154; 229/1.5 B; 229/21; 264/251; 264/259; 425/129
[51] Int. Cl.²................... B29D 3/00; B65D 3/20
[58] Field of Search............... 264/138, 153–156, 264/251, 252, 259, 261, 263, 295, 328; 425/129; 229/1.5 B, 16 R, 21

[56] References Cited
UNITED STATES PATENTS

| | | |
|---|---|---|
| 3,154,617 | 10/1964 | Schenk et al.................. 264/328 X |
| 3,476,852 | 11/1969 | Shattuck....................... 425/129 X |
| 3,511,902 | 5/1970 | Santangelo.................... 264/251 X |

FOREIGN PATENTS OR APPLICATIONS
45-37,870   1/1970   Japan................................ 425/129

*Primary Examiner*—Jan H. Silbaugh
*Attorney, Agent, or Firm*—Scrivener Parker Scrivener and Clarke

[57] ABSTRACT

The invention is concerned with a method for making an article such as a container having a circular end wall and a side wall folded from the arcuate edge of the end wall, the article being first formed as a flat blank having two panels conforming to the base and side walls, the peripheries of the panels intersecting each other with a slit being formed in the common intersecting portions to form a pair of hinges at the ends of the slit enabling one panel to be folded upwardly with respect to the other between two mold tools without rupturing the hinges, plastic material being injected into the mold to join the folded panels into a unitary container or similar article.

11 Claims, 4 Drawing Figures

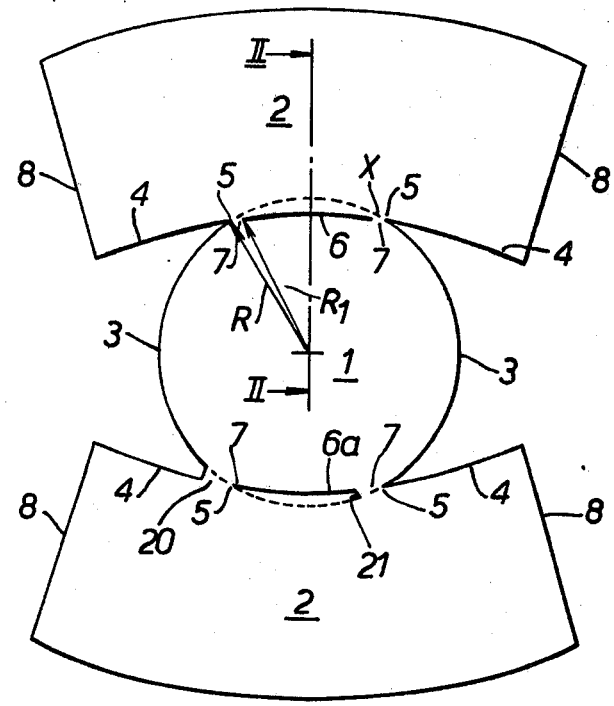
FIG./.
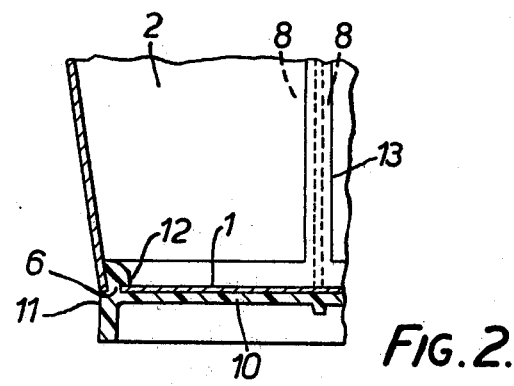
FIG.2.

METHOD FOR THE PRODUCTION OF COMPOSITE CONTAINERS

This invention is concerned with improvements in and relating to a method of making composite products and more particularly composite containers, that is to say containers formed from a blank of flexible material such as paper, card, or foil shaped to the shape of the container, adjacent edges of the container being seamed by injection moulding.

There is a method of making a composite container by providing a blank having a circular base panel and two side panels each having an edge substantially tangential to the circle of the base, and coupled to the base panel by a web on either side of the point of tangential contact. The side panels are folded about the tangential contact and the webs to position the free edges of each side panel beyond the associated web adjacent the free peripheral edge of the base panel, trapping the so formed blank between a cavity tool and a core tool and seaming the free edges of each side panel to the free edge of the base panel and the juxtaposed edges of the side panels by injection moulding, one of the tools having a recess adjacent each web into which recess excess material represented by the web will be received within a layer of injected material.

The protuberance presented by the excess material which has been pressed into the recess is aesthetically not very pleasing.

According to the present invention there is provided a method of making an article including at least two walls of which one projects from the surface of the other, comprising forming a blank to provide a panel in respect of each wall, forming a slit in the blank in the region between the panels to define a cut-away in at least one wall when the blank is folded about hinge parts integral with each panel remaining at each end of the slit, constraining the folded blank in the folded condition between two mould tools and injecting material into the mould cavity in the region of the cut-away to complete that wall.

In the case of a side panel coupled to a circular base panel to make a frusto-conical container, the arc of the edges of the side panel intersecting the circle of the base panel, the slit may be conveniently on the arc of the edges of the side panel or on the arc of the base panel. The former is preferred preserving as it does the continuity of the side panel and the ends of the slit may be angled or radiused to place those ends on the arc of the base panel. Thereby the hinges are foldable at the periphery of the wall which will be formed by the base panel and will fold about the edge of a core tool. Alternatively, the ends of the slit will be at the intersections of the arcs and a web will be provided beyond each intersection to form a hinge part lying outside the base panel circle. The slit may however be on neither arc and may be rectilinear but again it is preferred that it be within the arc of the edge of the base panel for the reason stated.

In order that the invention will be well understood, there will now be described some embodiments, given by way of example only, reference being had to the accompanying drawing in which:

FIG. 1 is a schematic plan view of a blank for producing a frusto-conical container;

FIG. 2 is a detail section through a part of the blank after folding and seaming, the section being on the line II—II of FIG. 1;

Figure 3:
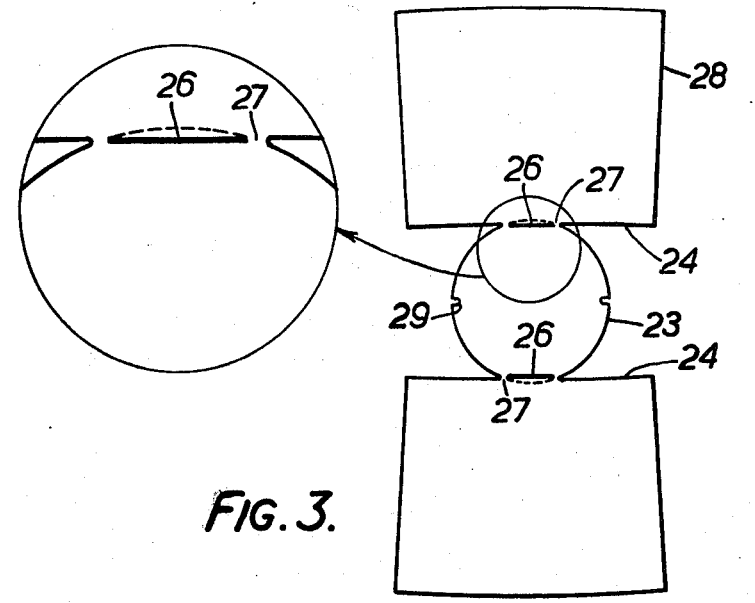
FIG. 3 is a plan view of a presently preferred blank for making a frusto-conical container.

Referring to the upper half of FIG. 1, the blank which may be of paper, card, foil or other suitable flexible material for making a receptacle, comprises a base panel 1 and two side panels 2. Panel 1 has arcuate free edges 3, in this case circular, and each end of each free edge of panel 1 meets an arcuate free edge 4 of a panel 2 at 5. The arcs of edges 3 and 4 intersect at the meeting point 5. Between the two meeting points 5 associated with each panel 2 is a slit 6 which, in the case shown, lies on the arc of the edge of the side panel 2. The ends of each slit are spaced from the associated meeting points 5 by hinge parts 7.

To make up the receptacle, the side panels 2 are folded relative to the base panel 1 at the parts 7 and the edges 4 are positioned adjacent edges 3. This brings seam edges 8 of each panel 2 adjacent seam edges 8 of the other side panel. The blank is held in the folded condition in a mould, a core tool and a cavity tool of which together define a space corresponding to the base and side wall of the receptacle. In the cavity tool and core tool are channels into which material will flow to form in the finished receptacle a base runner 10 on the outside of base panel 1, an outer peripheral band and support flange 11, an inner base seaming bead 12 and a side seaming bead 13. A lip bead may be included at the open end of the container. The material will enter the channel system at the center of the base panel, will flow along the runner 10 to the peripheral band and flange channel through each slit 6 to the channel defining the inner base bead 12 and thence along the side seam channels and lip channels if provided.

It will be seen that the arrangement of the blank panels and slit avoids the local surplus of blank material and an aesthetically pleasing product is provided. If desired each slit could follow the arc of the base instead of the side panel arc, but it is preferred to provide the slit within the base panel peripheral arc so that on folding, the continuity of the side panels is preserved. Other configurations of seaming channel can also be adopted with a different entry gate position or a plurality of gates. The invention is also applicable to other shapes of product.

The radii of the arcs and the distance of the projection of the free edges of the side panels radially inward of the base panel peripheral arc have been exaggerated for illustration.

The container may be produced on a machine as described in applicant's copending application Ser. No. 405,103, filed Oct. 10, 1973 and now U.S. Pat. No. 3,868,893.

The arrangement above described is satisfactory is the material of the blank has a degree of give.

Each end of the slit 6 should be as near as possible to the arc of the base panel. In practice with a non-yielding material if the edges 4 spring directly from the base panel arc, the ends of the slit cannot lie on the arc of the side panels and reach the base panel arc. On any one generatrix of the core, the material outside the slit must hinge when the blank end panel lies against the end face of a core tool and the side panel is folded to lie against the side of the core tool, to allow the side panel to lie along the generatrix of the core tool. However at each end of the slit 6, material cannot hinge because it is inside the base arc and inside the periphery of the end of the core tool.

This is illustrated by arrow R which is the radius of the base arc and the end of the core tool and R1 the radius on which lies each end of the slit. When the blank is folded on the core tool the material has to hinge, not on the line joining the ends of the radii R, R1 illustrated but on arc R, i.e., the edge of the core tool. Clearly if slit 6 is adopted the material must be such as to give in the region marked X which some materials will do.

When materials are used which will not give enough to allow this to happen without breaking, webs such as shown at 20 may be provided and the slit 6a, here on the arc of the side panel edge, taken to the intersections with the base panel arc, the web providing sufficient material to form an acceptable hinge part. Alternatively each end region such as 21 of a slit may be radiused or angled to bring the end of the slit to a point spaced inward of the adjacent intersection and on the base panel arc.

Instead of a cut lying on an arc of the free edges of a side panel it may be displaced from that arc. Thus, as shown in FIG. 3, which is the presently preferred arrangement of blank, the edges 24 of a side panel are arcuate and the slit is a rectilinear slit 26 extending to the intersection of the arc on which the edges 24 lie and the arc on which the periphery of the base panel lies. Webs 27 provide the material of hinge parts. The base panel has cut outs 29 to accommodate pin gates standing proud of the base of the cavity tool as will appear.

When the blank is folded to form a frusto-conical container, the base panel is no longer circular but has flats or near flats at the slits. There the side panels, when folded, are spaced from the base panel along the slits and, depending upon the position of the radially innermost position of each slit, will depend the extent to which the end of the side panel will, in the folded condition, project beyond the plane of the inner surface of the base panel. This degree is preferably such that when the blank is trapped in between a core tool 32 (FIG. 4) and cavity tool 33, the side panel edge 24 is slightly inwardly deflected and bears on the closed end of the cavity tool.

Figure 4:
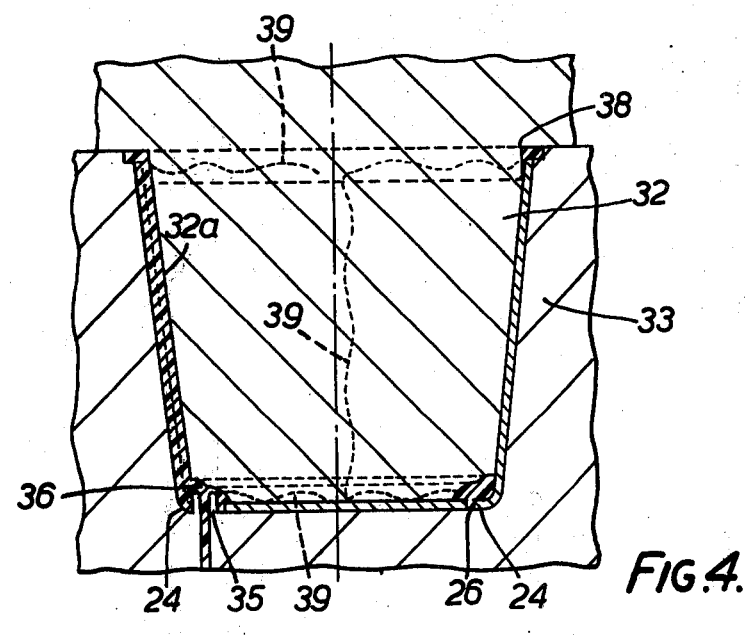
FIG. 4 is a section in two mutually perpendicular planes through a part of an injection moulding tool and the blank of FIG. 3 modified at the edges.

The material which is to be injected to seam the blank at the now juxtaposed side edges 28 and the edges of the slit 26 and the edges 23 and 24, is injected through a pin gate 35 at the base of each seam channel 32a in the core tool, the base panel 23 being recessed to accept the pin gates as above mentioned. In FIG. 4 each pin gate exit is proud of the closed end of the cavity tool. Thereby the injected material will flow into a base rim recess 36 defined by the core tool and down on to the edge of the side panel and base panel. This will urge those edges against the cavity tool and inhibit flow of material between the blank and the cavity tool. Another particular advantage is that the free edges of the blank are sealed by the injected material, which, if the blank is porous, such as of card, will prevent wicking through those edges.

The base rim recess will allow material to flow round the base panel peripheral margin to seal this to the side panels and to flow into the regions vacated by the blank at the cuts as the blank is folded. The tools may define a lip channel 38 with which channels 32a communicate.

The edges of the blank at the lip of the container may be undulated to improve the anchorage of the injected lip by providing a variable flow path for the injected material between axial and radial limbs of the lip. Such undulations may advantageously be provided at the side seams and the base to side panel seams to improve these seams. Such undulations are indicated at 39 in FIG. 4.

Furthermore the edges at the side seams may be castellated. The undulations suggested for the edges of the side panels relieve stress areas in the injected plastics which might otherwise exist with straight edges while the castellated edges at the side seams give greater bursting strength.

The width of one panel at its edge remote from the base is made fractionally less than the corresponding edge of the other side panel to assist in positioning the blank in a guideway of the moulding machine as described in copending U.S. patent application Ser. No. 405,103 filed Oct. 10, 1973 of Brian Sutch, now U.S. Pat. No. 3,868,893.

I claim:

1. The method of making an article having a first wall including an arcuate edge portion and a second wall folded relative to the first wall from the arcuate edge portion of said first wall comprising forming a flat blank having first and second panels conforming to the respective first and second walls with the arc of the arcuate edge portion of said first panel intersecting the adjacent edge of said second panel at two spaced positions, forming a slit in the blank between said spaced positions to define a pair of hinge parts at the ends of the slit adjacent the points of intersection of said panels and also to define a cut-away in at least one of the panels when the panels are folded relative to one another about said hinge parts to the relative panel positions required by the shape of the article, folding said panels to said relative positions, confining the so folded panels between two mould tools which define a blank cavity for receiving the panels in their relative folded positions and also define a mould cavity in the region of the cut-away and in the region of edges of the panels juxtaposed by virtue of folding said panels to their relative positions, and injecting material into the mould cavity to complete that panel having the cut-away formed by said slit and to connect said juxtaposed edges.

2. The method of claim 1 wherein said hinge parts are formed so that they fold along lines substantially tangent to the arcuate edge portion of the first panel.

3. The method of claim 1 wherein the slit is formed so as to intersect at each end the arc of the arcuate edge portion of the first panel with the respective hinge parts extending from said points of intersection of the panels to the point where the ends of the slit intersect the arc of the first panel.

4. The method of claim 1 wherein the intersecting edge of the second panel is defined by the arc of a circle having a greater radius than that of the arcuate edge portion of the first panel.

5. A method according to claim 4 in which the slit is at a radial distance from the centre of the circle of the first panel no greater than the radius of that circle and at a distance from the centre of the circle of the second panel at least as great as the radius of that circle, folding of the panel at the hinge parts being effected substantially on the periphery of the wall defined by the panel which is cut-away.

6. A method according to claim 4 in which the slit is linear.

7. A method according to claim 4 in which the slit is arcuate.

8. A method according to claim 7 in which at least the mid-part of the slit lies on the circle of the second panel.

9. A method according to claim 8 in which material is injected into the cavity through a pin gate in a cavity tool.

10. A method according to claim 9 in which the panel defining the cut-away accommodates a pin gate standing proud of the base of the cavity tool.

11. A method according to claim 10 in which a plurality of side walls are to be provided upstanding from the surface of an end wall, each side wall being integral with the end wall, a slit being made between each side wall panel and the end wall panel, the end wall including at least one recess adjacent the location of the ends of a pair of juxtaposed side edges of adjacent side panels when the blank is folded to accommodate a pin gate.

* * * * *